United States Patent
Pandey

(10) Patent No.: US 7,439,813 B2
(45) Date of Patent: Oct. 21, 2008

(54) METHOD AND SYSTEM FOR GENERATING CARRIER FREQUENCIES FOR UWB APPLICATION

(75) Inventor: Awadh Pandey, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 191 days.

(21) Appl. No.: 11/381,133

(22) Filed: May 2, 2006

(65) Prior Publication Data

US 2007/0259640 A1 Nov. 8, 2007

(51) Int. Cl.
*H03L 7/00* (2006.01)

(52) U.S. Cl. .......................... 331/2; 375/132; 375/135; 375/136; 375/327; 375/308; 375/130; 331/14; 455/102; 455/103; 455/323; 455/313; 455/260; 370/204; 332/127

(58) Field of Classification Search ................. 375/132, 375/135, 136, 327, 308, 130; 455/102, 103, 455/323, 313, 260; 331/14, 2; 370/204; 332/127
See application file for complete search history.

(56) References Cited

U.S. PATENT DOCUMENTS

| | | | | |
|---|---|---|---|---|
| 2004/0005869 A1* | 1/2004 | See et al. | ..................... | 455/102 |
| 2004/0178855 A1* | 9/2004 | Gharpurey et al. | ............ | 331/14 |
| 2005/0013344 A1* | 1/2005 | Abdellaoui et al. | ......... | 375/130 |
| 2005/0143041 A1* | 6/2005 | Lee et al. | ..................... | 455/313 |
| 2005/0243709 A1* | 11/2005 | Santhoff et al. | ............. | 370/204 |
| 2006/0183455 A1* | 8/2006 | Cha et al. | ................... | 455/323 |
| 2007/0105518 A1* | 5/2007 | Chang et al. | ................ | 455/260 |

* cited by examiner

*Primary Examiner*—Robert J. Pascal
*Assistant Examiner*—Gerald Stevens
(74) *Attorney, Agent, or Firm*—Global IP Services, PLLC; Prakash Nama

(57) ABSTRACT

Apparatus and method for generating first, second and third carrier frequencies of 3432 MHz, 3960 MHz and 4488 MHz respectively, for use in a wireless transmission system deploy only first and second PLLs which are configured to generate 6336 MHz and 2640 MHz signals respectively with only in-phase components. Frequency dividers are employed for frequency-dividing the 6336 MHz signal severally by 2, 4, and 12 to obtain frequency-divided intermediate outputs with both in-phase and quadrature components. The intermediate output components and other intermediate signal components are selectively combined in a mixer (e.g., a single sideband mixer), for deriving the first, second and third carrier frequencies of 3432 MHz, 3960 MHz and 4488 MHz with both in-phase and quadrature components. The invention has application in UWB, WPAN, WLAN, or other wireless systems and has the simplicity and advantages of using only two PLLs instead of the prior art arrangements of three PLLs.

12 Claims, 2 Drawing Sheets

METHOD AND SYSTEM FOR GENERATING CARRIER FREQUENCIES FOR UWB APPLICATION

FIELD OF THE INVENTION

This invention generally relates to a method and system for generation of multi-band carrier frequencies, and more particularly, to generation of multi-band carrier frequencies suitable for wireless systems, e.g., UWB (Ultra Wide Band) applications.

BACKGROUND OF THE INVENTION

UWB transceivers generally operate in the range of 3.1 to 10.6 GHz. As known, UWB frequency has a range of 3.1-4.8 GHz and is divided into several bands. When there are three carrier frequency bands, the first band may be 3432 MHz, the second may be 3960 MHz and the third one may be 4488 MHz carrier frequency, with a channel spacing of 528 MHz. p Clock generators are an essential part of a wireless transmission system. A clock generator is used to generate different carrier frequencies which are required to modulate different aspects of channel information with multiplexing. One of these schemes is used in an UWB system where the channel information is modulated with OFDM (Orthogonal Frequency Division Multiplexing). For OFDM and other applications, it is required to generate a clean clock signal (with very low phase noise/jitter) for modulation of the data. A clock generator may use a PLL (Phase Locked Loop) and a VCO (Voltage Controlled Oscillator).

Generally, the required carrier frequencies are generated by PLLs. A PLL is a major component in the frequency synthesizer scheme and uses a wide, flexible range of internal frequency dividers which allow the designer the ability to create a frequency synthesizer to match design requirements.

Some essential performance requirements for general RF wireless transceiver systems include:
1. Low phase noise
2. Low cost (power, area)
3. Low settling time/less hopping time between different carrier frequencies
4. Low spurious/harmonic signals
5. Stable outputs in spite of process/temperature/voltage variations
6. VCO of a clock generator PLL should work at a frequency which is higher than the required carrier frequencies to avoid "VCO pulling effect" due to any of these carrier frequencies, which may cause false locking of the VCO.

For an UWB system Band-A, the required carrier frequencies are:
a. 3432 MHz
b. 3960 MHz
c. 4488 MHz These frequencies are hopped within a very short duration (<300 ns) due to symbol switching for OFDM transmission, with the result that a very small portion of this time interval (<9 ns) is available for stabilization of the carrier frequency (one out of these 3 at a time). Owing to these fast hopping requirements, all the 3 frequencies should be available simultaneously, and a frequency multiplexer is used to select one out of the three carrier frequencies.

A conventional method to generate 3 carrier frequencies is to use 3 different PLLs and multiplex the outputs of these PLLs. These PLLs need to work at twice the frequencies to meet requirement #6 as mentioned above, and these frequencies are then divided by 2 to generate the required frequencies.

The disadvantages of these prior art schemes include:
1. Higher cost (3 PLLs consume a large amount of power, and area).
2. More closed loop blocks, more issues related to stability.
3. Difficulties of implementation, as all the PLLs are working at high speeds.

It is desirable to address the foregoing disadvantages and provide an improved system and method for generating carrier frequencies required for wireless transmission applications.

SUMMARY OF THE INVENTION

The invention provides an improved system and method embodying an RF clock generator, for generating multi-band carrier frequencies required for wireless transmission applications, e.g., for an UWB system. The invention is also applicable, without limitation, in WPAN (Wireless Personal Area Network) and WLAN (Wireless Local Area Network) systems. In one embodiment, the invention deploys two PLLs producing in-phase components of two predetermined frequencies that are selectively divided, processed and handled in multiplexers and passed through a mixer for generating three carrier frequencies with both in-phase and quadrature components, so that the carrier frequencies can be used in an OFDM (Orthogonal Frequency Division Multiplexing) system.

One embodiment of the invention resides in a RF (Radio Frequency) clock generator of the type that uses a PLL (Phase Locked Loop) for enabling generation of first, second and third carrier frequencies, comprising: first and second PLLs configured to generate first and second predetermined frequency signals; frequency dividers for dividing said first and second predetermined frequency signals selectively and completing processing for producing intermediate frequency-divided outputs; and, a mixer, e.g., a single side band mixer, for selectively mixing said intermediate frequency-divided outputs and a signal derived from the second predetermined frequency signal, for generating said first, second and third carrier frequencies.

A second embodiment of the invention resides in an RF clock generator of the type that uses a PLL for enabling generation of first, second and third carrier frequencies of 3432 MHz, 3960 MHz and 4488 MHz respectively, for use in an OFDM wireless transmission system, comprising: first and second PLLs configured to generate 6336 MHz and 2640 MHz signals respectively with only in-phase components; frequency divider means to divide the 6336 MHz signal severally by 2, 4 and 12 and also process the signals to produce intermediate frequency-divided outputs having both in-phase and quadrature components; and, a single side band mixer for using said frequency-divided outputs and other outputs from said PLLs to obtain said first, second and third carrier frequencies containing both in-phase and quadrature components.

Another embodiment resides in a method of generating first, second and third carrier frequencies of 3432 MHz, 3960 MHz and 4488 MHz respectively, for use in a wireless transmission system by deploying only first and second PLLs, comprising the steps of: using said first and second PLLs to generate 6336 MHz and 2640 MHz signals respectively with only in-phase components; frequency-dividing the 6336 MHz signal severally by 2, 4, and 12 to obtain frequency-divided intermediate outputs with both in-phase and quadrature components; and, deriving the first, second and third carrier frequencies of 3432 MHz, 3960 MHz and 4488 MHz with both in-phase and quadrature components by suitably combining selected ones of the frequency-divided intermediate outputs and other intermediate signal components in a single mixer, e.g., side-band mixer.

Also included herein is an article comprising a storage medium having instructions thereon which when executed by a computing platform will result in execution of the foregoing method.

The two PLLs used in the architecture of the present invention expediently use a reference clock of predetermined frequency, e.g., 33 MHz, and work in conjunction with other components including multiplexers, a frequency and phase detector, charge pump, loop filter and frequency dividers including means for phase-splitting. Information regarding such components is known to those skilled in the art.

BRIEF DESCRIPTION OF THE DRAWING

A more detailed understanding of the invention may be had from the following description of embodiments, given by way of example. In the following detailed description of the embodiments, reference is made to the accompanying drawing that forms a part hereof, and in which are shown by way of illustration of specific embodiments in which the invention may be practiced. It is understood that other embodiments may be utilized and changes in configuration may be made without departing from the scope of the present invention.

In the accompanying drawing.

DETAILED DESCRIPTION

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and their equivalents, and the invention encompasses numerous alternatives, modifications and equivalents. For purposes of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

The proposed clock generator architecture generates all three radio frequency carrier frequencies (3432 MHz, 3960 MHz and 4488 MHz) by using only two PLLs and one SSB (Single Side Band) mixer. The advantages of this novel architecture include the following:

1) It needs only an in-phase VCO (Voltage Controlled Oscillator) design instead of quadrature VCO, thereby saving both power and area, for OFDM applications.
2) Circuit design challenges are reduced.
3) SSB switching is not needed, which eliminates the spurs generation and improves the phase noise of the system.
4) The architecture enables the system to work at a fast hopping rate.

Figure 1:
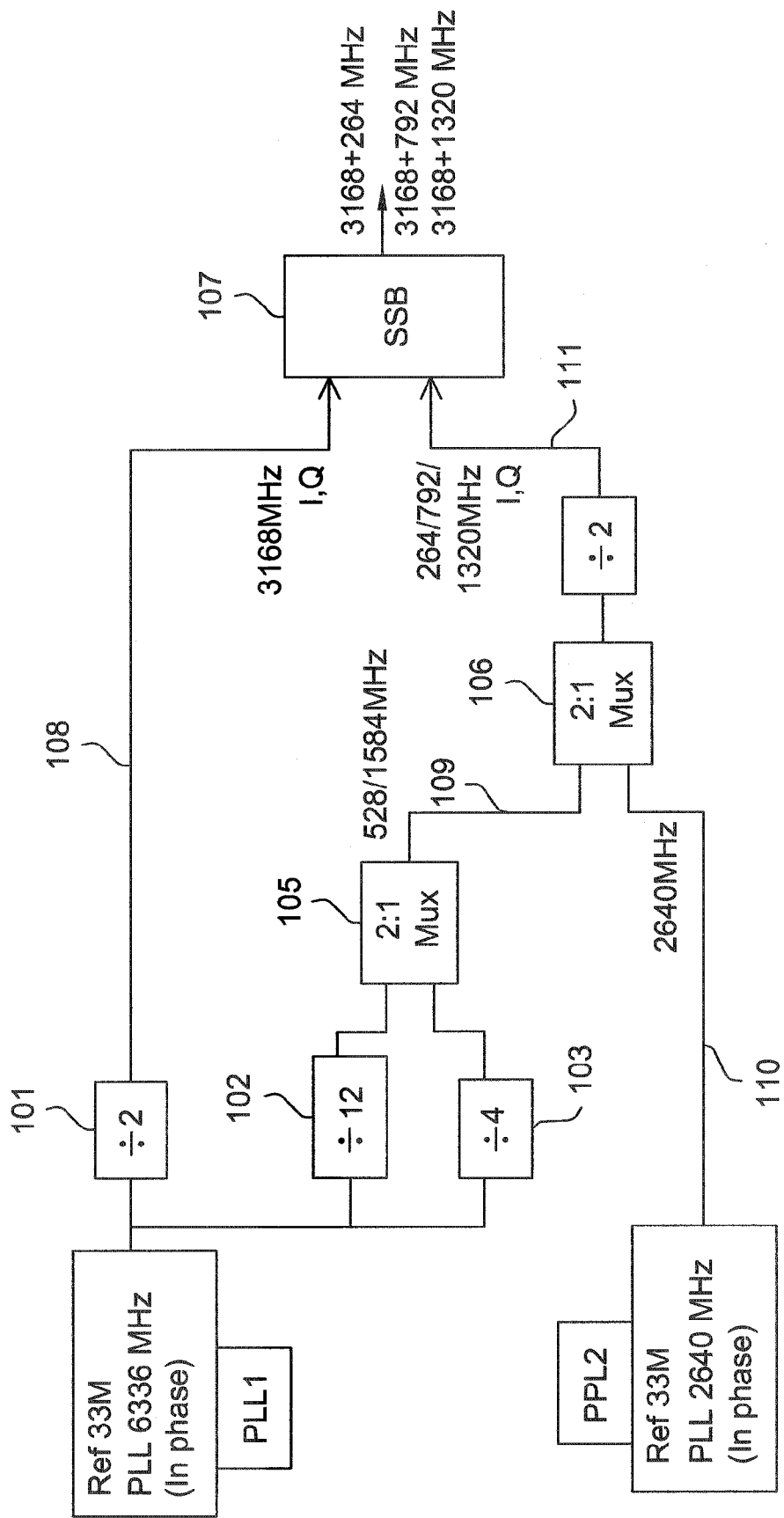
FIG. 1 illustrates an architecture for generating three carrier frequencies, by employing only two PLLs, dividers and a mixer; and, FIG. 2 illustrates a general purpose computing platform that can be used in implementing the present invention.

As illustrated in FIG. 1, there are two phase locked loops PLL1 and PLL2 in the system. PLL1 is configured to work at 6336 MHz frequency with only I phase output. The PLL2 is working at 2640 MHz of frequency, expediently with only I phase output. The building blocks of the PLLs include standard phase frequency detector, charge pump, loop filter, VCO and dividers. As shown in FIG. 1, the output of VCO1 in PLL1 is divided by 2 at 101 and processed to get a frequency of 3168 MHz (108) with both in-phase and quadrature components. Additionally and severally, the output of VCO1 in PLL1 is divided by 4 (as shown at 103) and 12 (as shown at 102) and processed to generate 1584 and 528 MHz frequencies respectively (with in-phase and quadrature components), and the divided frequencies are handled in a first multiplexer 105. The output 109 of the first multiplexer and the output 110 of the PLL2 are handled in a second multiplexer 106 and again divided by 2 and processed to produce an output (111) of 264/792/1320 MHz having both in-phase and quadrature components. The outputs 3168 MHz and 264/792/1320 MHz are selectively combined in a SSB (Single Side Band) mixer 107 to generate the required carrier frequencies of 3432 MHz, 3960 MHz, and 4488 MHz.

PLLs need to use their own reference clocks, and as shown in FIG. 1, the PLLs 1 & 2 include their reference clocks to operate, for example, at a frequency of 33 MHz. It is understood that fully differential circuits can be utilized to reduce the common mode noise in the output of the PLLs. Also, since an OFDM system where the present carrier frequencies can be used needs both I and Q (In phase and Quadrature) outputs of the carrier, the final outputs delivered by the architecture are indeed generated with I and Q components, even though the intermediate signals within the PLL can be single phase components only.

The description herein above is just an example of how three carrier frequencies of 3432 MHz, 3960 MHz, and 4488 MHz are generated by the use of only two PLLs generating only in-phase components with architecture as illustrated in FIG. 1 and described in connection therewith. By implementing the present invention using only two PLLs, the advantages realized include lower cost (by eliminating one PLL), fewer issues relating to stability, and desirability of implementation since the PLLs are working at high speeds. Additionally, the present architecture enables working at a fast hopping rate, and uses only VCOs with in-phase components. Moreover, SSB switching is not needed, thereby improving the phase noise of the system, and, circuit design challenges are reduced compared with the prior art scenario. The two PLLs used in the present architecture work in conjunction with other components including a frequency and phase detector, charge pump, loop filter and frequency dividers including means for phase-splitting. Information regarding such components is known to those skilled in the art, and more specific details of the foregoing components are not provided herein so that the crux of the invention is not obliterated.

The proposed technique would make the present invention valuable by way of innovation in the area of clock generation, which is useful in all wireless transceivers, specifically for UWB (Ultra Wide Band) RF front end transceivers. It is believed that this will add value to the quality of next generation wireless products incorporating UWB wireless devices, including those used in WPAN, WLAN and other wireless systems. The functions of frequency-division, processing for phase-splitting and multiplexing can be supervised and controlled by a general purpose computer, or any suitable processor, either pre-programmed or otherwise.

Figure 2:
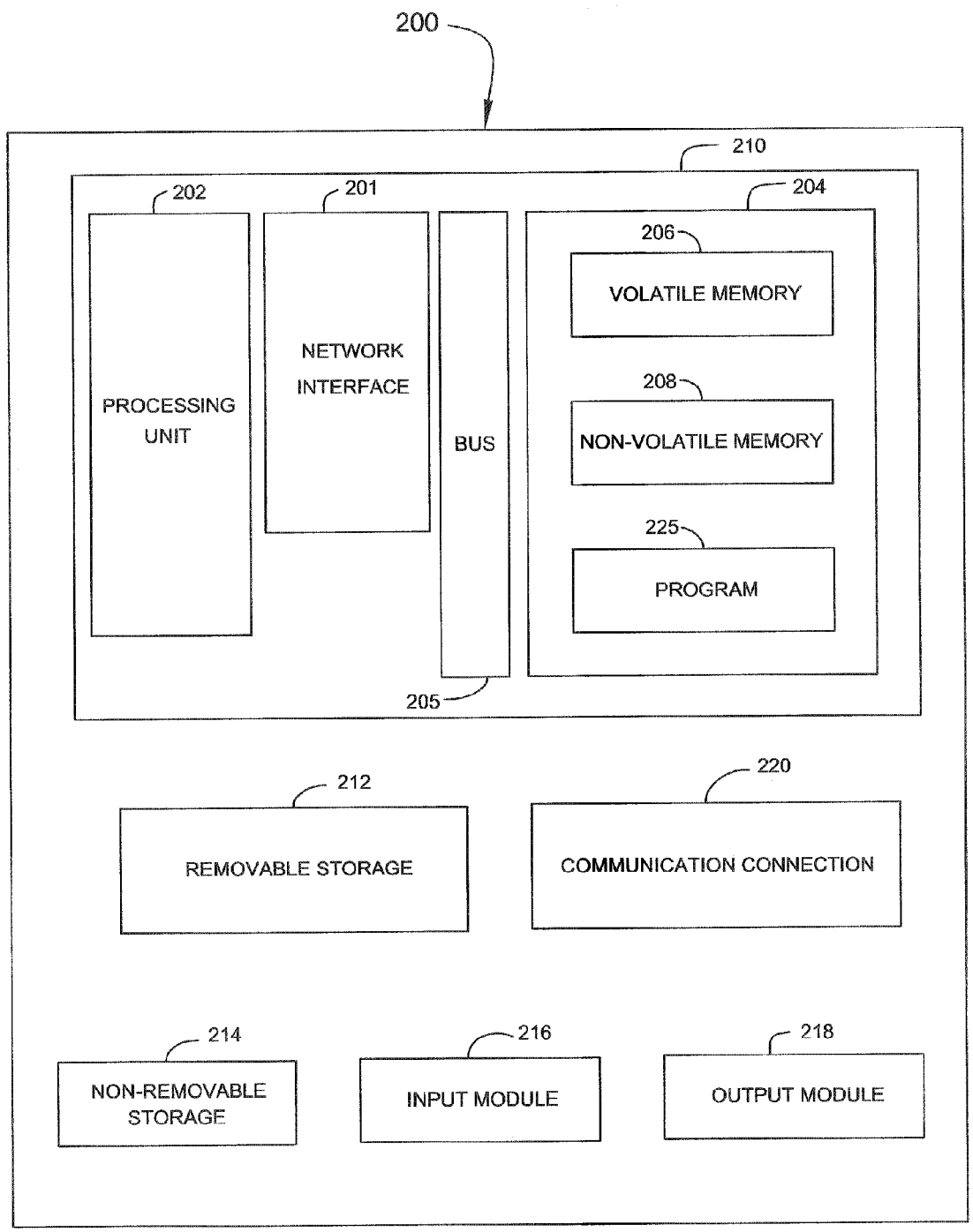

FIG. 2 shows an example of a suitable computing system environment for implementing embodiments of the present subject matter. FIG. 2 and the following discussion are intended to provide a brief, general description of a suitable computing environment in which certain embodiments of the inventive concepts contained herein including the frequency division, phase-splitting and signal multiplexing may be implemented.

A general computing device, in the form of a computer 210, may include a processing unit 202, memory 204, removable storage 212, and non-removable storage 214. Computer 210 additionally includes a bus 205 and a network interface (NI) 201.

Computer 210 may include or have access to a computing environment that includes one or more user input devices 216, one or more output devices 218, and one or more communication connections 220 such as a network interface card or a USB connection. The one or more user input devices 216 can be a touch screen and a stylus and the like. The one or more output devices 218 can be a display device of computer, computer monitor, TV screen, plasma display, LCD display, display on a touch screen, display on an electronic tablet, and the like. The computer 210 may operate in a networked environment using the communication connection 220 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 204 may include volatile memory 206 and non-volatile memory 208. A variety of computer-readable media may be stored in and accessed from the memory elements of computer 210, such as volatile memory 206 and non-volatile memory 208, removable storage 212 and non-removable storage 214. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, chemical storage, biological storage, and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 202 of the computer 210. For example, a computer program 225 may include machine-readable instructions capable of implementing required frequency division of the PLL outputs, phase-splitting and multiplexing as described with reference to the exemplary embodiment of the present subject matter. In one embodiment, the computer program 225 may be included on a CD-ROM and loaded from the CD-ROM to a hard drive in non-volatile memory 208. The machine-readable instructions cause the computer 210 to decode according to the various embodiments of the present subject matter.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled.

The invention claimed is:

1. An RF clock generator of the type that uses a PLL for enabling generation of first, second and third carrier frequencies of 3432 MHz, 3960 MHz and 4488 MHz respectively, for use in a wireless transmission system, comprising:
    first and second PLLs configured to generate 6336 MHz and 2640 MHz signals respectively with only in-phase components;
    frequency dividers to divide the 6336 MHz signal severally by 2, 4 and 12 to obtain a first set of intermediate frequency-divided outputs having both in-phase and quadrature components, and to divide the 2649 MHz signal by 2 after passing it through a multiplexer to obtain a second intermediate frequency-divided output; and,
    a single side band mixer for inputting said first set of intermediate frequency-divided outputs and said second intermediate frequency-divided output to obtain the first, second and third carrier frequencies to contain both in-phase and quadrature components,
    wherein said frequency dividers are configured to divide in half, a signal obtained from combining the second predetermined frequency signal with another signal derived from divisions of the first predetermined frequency signal before feeding the single side band mixer.

2. The RF clock generator as in claim 1 configured for use in a UWB system.

3. The RF clock generator as in claim 1 configured for use in a WPAN (Wireless Personal Area Network) system.

4. The RF clock generator as in claim 1 configured for use in a WLAN (Wireless Local Area Network) system.

5. The RF clock generator as in claim 1 including a multiplexer means selectively connected before the single side band mixer.

6. The RF clock generator as in claim 1, wherein each of said first and second PLLs includes a reference clock, frequency detector, charge pump, loop filter, and a voltage controlled oscillator.

7. A method of generating first, second and third carrier frequency signals of 3432 MHz, 3960 MHz and 4488 MHz respectively using an RF clock generator of the type that uses a PLL, for application in a wireless transmission system, the method comprising:

using first and second PLLs configured to generate 6336 MHz and 2640 MHz signals respectively with only in-phase components;

using frequency dividers to divide the 6336 MHz signal severally by 2, 4 and 12 to obtain a first set of intermediate frequency-divided outputs having both in-phase and quadrature components, and to divide the 2649 MHz signal by 2 after passing it through a multiplexer to obtain a second intermediate frequency-divided output; and, using a single side band mixer for inputting said first set of intermediate frequency-divided outputs and said second intermediate frequency-divided output to obtain the first, second and third carrier frequencies to contain both in-phase and quadrature components;

wherein said frequency dividers are configured to divide in half, a signal obtained from combining the second carrier frequency signal with another signal derived from divisions of the first carrier frequency signal before feeding said single side band mixer.

8. The method of generating first, second and third carrier frequency signals as in claim 7, configured for use in UWB system.

9. The method of generating first, second and third carrier frequency signals as in claim 7, configured for use in a WPAN (Wireless Personal Area Network) system.

10. The method of generating first, second and third carrier frequency signals as in claim 7, configured for use in a WLAN (Wireless Local Area Network) system.

11. The method of generating first, second and third carrier frequency signals as in claim 7, wherein the step of deriving comprises using a multiplexer means selectively connected before said single side band mixer.

12. The method of generating first, second and third carrier frequency signals as in claim 7, wherein each of said first and second PLLs includes a reference clock, frequency detector, charge pump, loop filter, and a voltage controlled oscillator.

\* \* \* \* \*